Aug. 26, 1924.  
W. ELLWOOD  
1,506,167  
TENSION REGULATOR FOR DRIVING BELTS  
Filed March 17, 1921    2 Sheets-Sheet 2
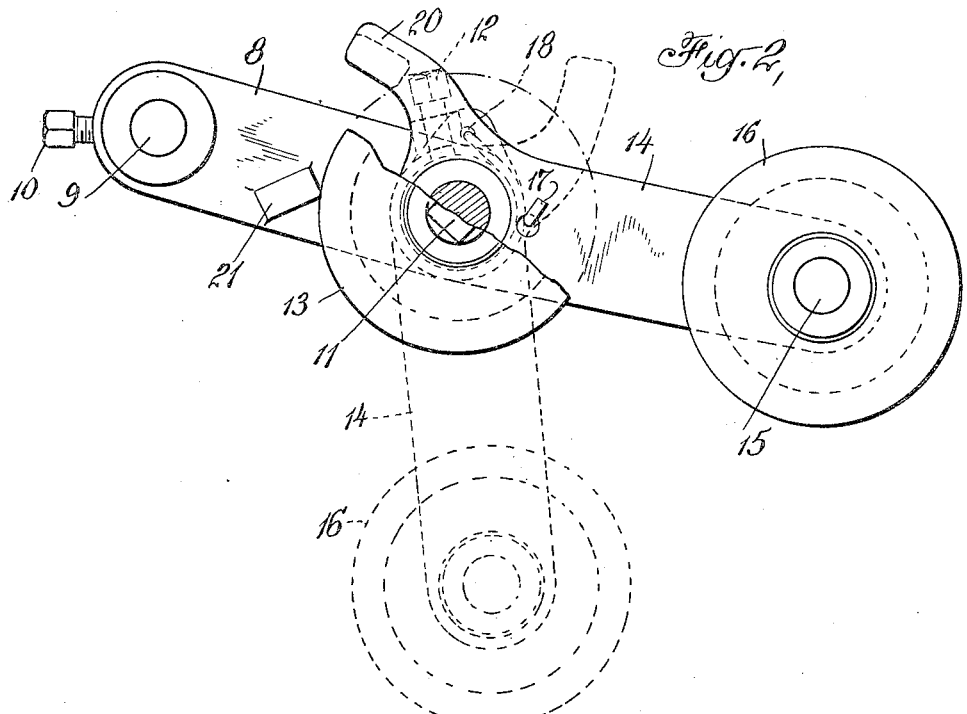
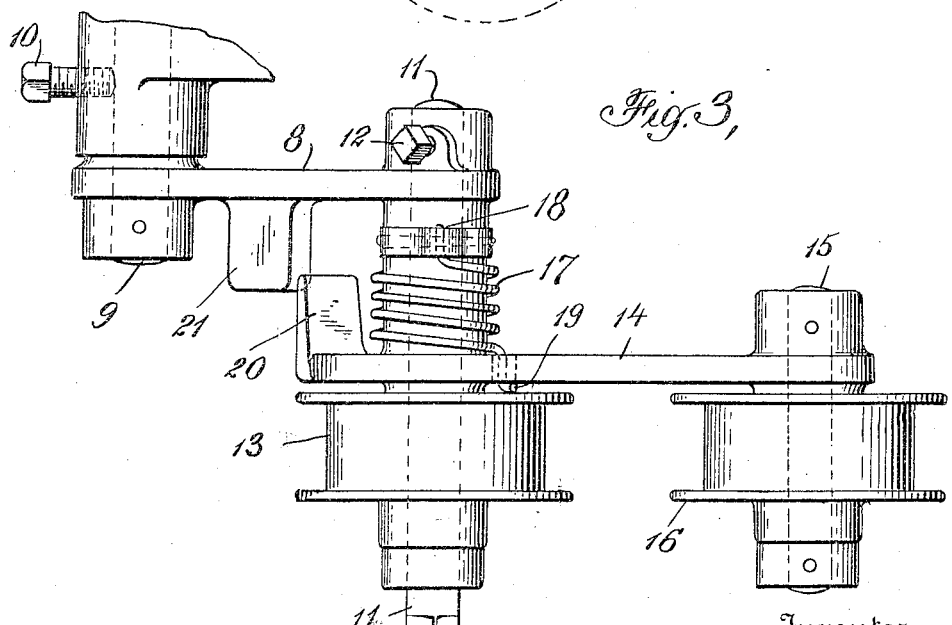

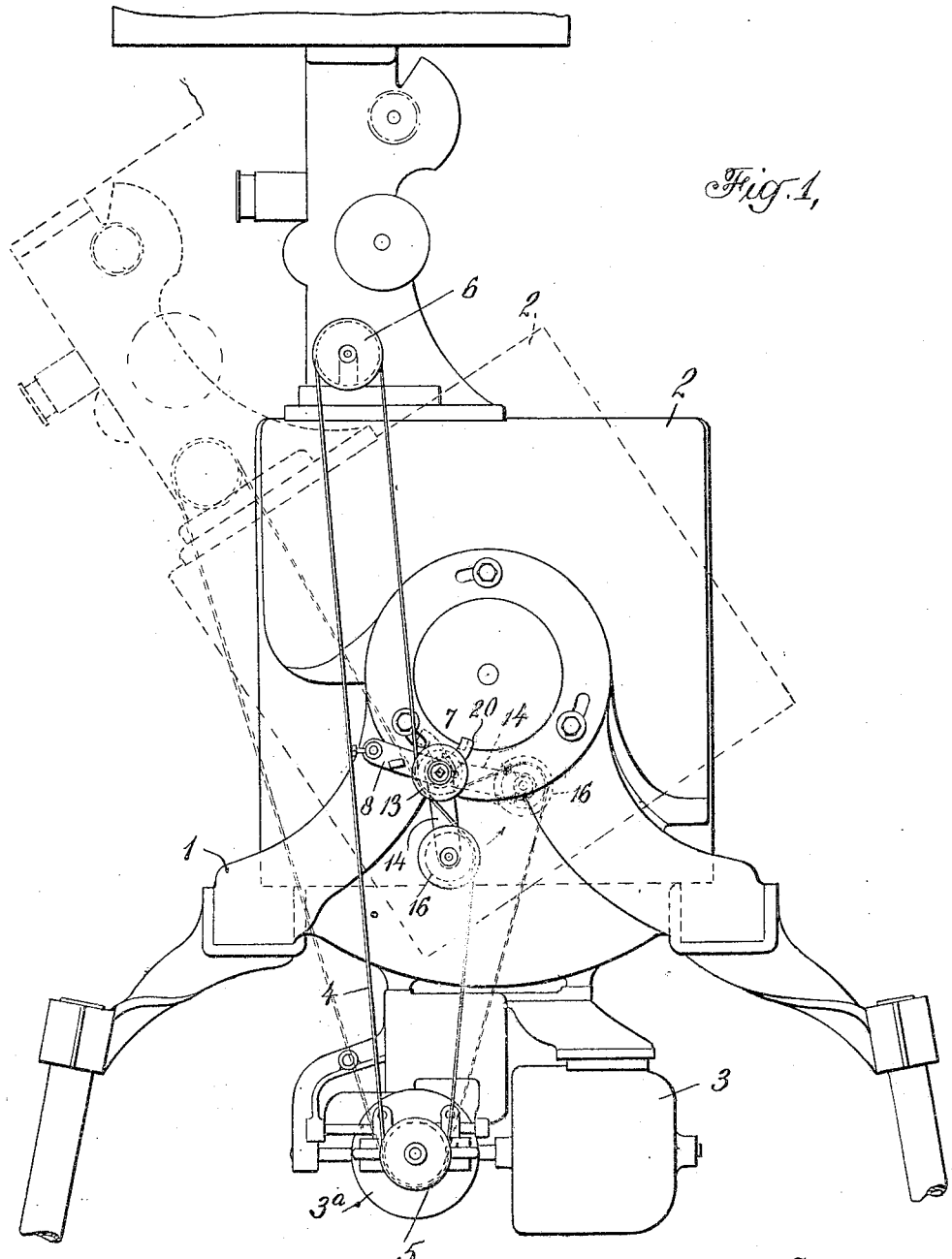

Patented Aug. 26, 1924.

1,506,167

UNITED STATES PATENT OFFICE.

WILLIAM ELLWOOD, OF NEW YORK, N. Y., ASSIGNOR TO NICHOLAS POWER COMPANY, INC., OF NEW YORK, N. Y., A CORPORATION OF DELAWARE.

TENSION REGULATOR FOR DRIVING BELTS.

Application filed March 17, 1921. Serial No. 452,902.

*To all whom it may concern:*

Be it known that I, WILLIAM ELLWOOD, a citizen of the United States, residing at New York city, in the county of New York, State of New York, have invented certain new and useful Improvements in Tension Regulators for Driving Belts; and I do hereby declare the following to be a full, clear, and exact description of the invention, such as will enable others skilled in the art to which it appertains to make and use the same.

The present invention relates to improvements in motion picture machines. In the construction of motion picture projectors it is common to employ a rigid supporting stand and to have the arc and film carrying apparatus assembled as a unit and tiltably mounted on the support enabling the rays to be projected at various angles to the horizontal as necessitated by the elevation of the machine at each particular installation. A power drive is commonly used comprising an electric motor mounted on the supporting frame and transmitting power to the film driving sprockets by means of a belt. The belt pulley on the motor shaft is fixed relative to the frame but the other pulley, being mounted on the tiltable part of the projector, moves whenever the angle of throw is varied and consequently changes the distance between the pulley centers. Thus if the tension of the belt is correct for one angle of tilt it will not be correct for any other angle.

For the purpose of regulating the belt tension it is common to adjustably mount an idle pulley to engage one side of the belt loop intermediately between the two main pulleys, so that by shifting the idle pulley at right angles to the length of the belt slack may be taken up or tension relieved, as the case may be. The setting of this adjustable pulley is accomplished by hand, and at every change in the angle of throw it is necessary to alter its adjustment if proper tension in the belt is to be attained. This method is open to objection from the view point of both the theatre owner and the manufacturer of motion picture apparatus. The proper adjustment of the belt for the machine to operate under the best conditions can be determined only by experience, and although the machine may be set up at the factory with the adjustment such as to give the proper range of operating speeds of the machine without overloading the motor, the operator in setting up the machine in the theatre where it is installed has to readjust the belt and may not secure the proper tension. The belt is apt to be made too tight causing undue power consumption, overheating of the driving motor, and excessive wear or even breakage of the belt, or it may be too loose, resulting in slipping and consequent intermittent driving of the film.

It is an object of the present invention to provide means in a motion picture projector for securing the proper tension of the driving belt and maintaining it constant for all angles of throw.

A further object of the invention is to provide a tension regulator of this type which is exceedingly simple in construction, adds very little to the cost of the projector, is easily applied to machines already in operation, and which satisfactorily maintains the belt tension constant with no attention from the operator.

In accordance with my invention an adjustable pulley is brought to bear on one side of the belt and is positioned manually so as to secure action of the pulley over the entire working range, while a second adjustable pulley is caused to bear with constant pressure on the opposite side of the belt and has freedom of movement allowing it to follow up the belt as it slackens or tightens when the machine is tilted, thus insuring a constant tension for all angles of throw within the range of the projector.

I have illustrated a preferred embodiment of my invention in the accompanying drawings, in which Fig. 1 is an elevation of a motion picture projector equipped with my improvement; Fig. 2 is a plan view and Fig. 3 an elevation of my improvement. My invention is shown applied to a stand of the type disclosed in Patent No. 1,337,267 of April 20, 1920.

The supporting frame is indicated at 1, and the tiltable portion of the projector at 2, the position shown in full lines being for a horizontal throw and the position indicated by dotted lines for an angle throw. An electric motor 3 actuates the film driving mechanism by means of a friction gear 3ª and a belt 4 which passes over a pulley 5 on the shaft of the driven disc of the friction gear. The belt 4 drives a pulley 6 connected to the film driving sprockets. When the projector is set for a horizontal throw, as shown in full lines in Fig. 1, there is a certain distance between the pulley centers, but when the machine has been tilted to the position shown in dotted lines the distance between the pulley centers is lessened, as is evident by reference to Fig. 1, thus giving rise to a considerable amount of slack in the belt.

My improved belt adjuster, shown in Fig. 1 at 7 and illustrated in detail in Figs. 2 and 3, comprises means for absorbing this slack and holding the belt at constant tension for all positions of tilt. The full lines indicate the position of the parts corresponding to horizontal throw, and the dotted lines show the position corresponding to an angle throw. The device comprises a link 8 pivoted at one end to the frame 1 by means of a shaft or pin 9 and adapted to be secured in any given position by means of set screw 10. The other end of the link is adapted to receive a pin 11 secured in place by means of set screw 12 and carrying at its outer end the pulley 13. To this pin 11 is also pivoted a link 14 carrying at its outer end the pin 15 upon which rotates pulley 16, the pulleys 13 and 16 lying in the same vertical plane. A coil spring 17 is placed around pin 11 one end 18 secured to the pin and the other end formed into an extension 19 adapted to engage the link 14 as shown, exerting a pressure upon it. The spring comprises a number of turns sufficient to allow its free end 19 to be rotated somewhat about the pin 11 without materially changing the pressure it exerts. Link 14 is capable of rotation about pin 11 as an axle, the extent of its movement being limited by an extension 20 which engages a stop 21 on the link 8.

The machine is set up with the upper part of the stand horizontal. The belt adjuster is assembled on the stud 9 with the pulleys 13 and 16 placed on opposite sides of the belt, as shown in Fig. 1. The link member 8 is set in about the position shown in the drawings and made secure by tightening screw 10, whereupon spring 17 causes the pulley 16 to engage the belt with a constant pressure. If now the angle of tilt is changed the condition of slack in the belt will change and the spring 17 will revolve link 14 about its axis and cause the pulley 16 to follow up the belt and maintain a constant pressure on it. The position of the member 8 may be varied manually, if desired, to alter the range over which automatic regulation of the tension can be accomplished.

My improved belt adjuster is particularly useful in machines used by lecturers, etc., under circumstances requiring the same machine to be frequently set up in different locations. Differences in the belt tension, although slight, will cause variations in the speed and the operator can not give a perfect exhibition if at each setting of his machine he has to experiment with the speed control to get the machine running properly. If the belt is excessively loose member 8 will be turned down out of a horizontal position in order that the action of pulley 13 alone will produce a large deflection of the belt from its normal course, but in case the belt tension is about right for the maximum distance between pulley centers member 8 will be set approximately horizontal in order that pulley 13 will produce little deflection of the belt. When the angle of throw is changed pulley 13 remains in its same position, and constant tension is maintained by movement of pulley 16 alone.

For convenience in regulating the tension of spring 17 to the desired value pin 11 is squared at its outer end to afford a grip for a wrench or other tool by means of which the pin may be turned about its axis. The end 18 of the spring is secured in fixed relation to the pin, while the end 19 is in engagement with lever 14 and is free to assume various positions relative to the pin. Consequently, if pin 11 is rotated and member 14 held fixed, the pin will carry the spring end 18 with it and tighten or loosen the spring depending on the direction of rotation. When the pin has been rotated into such a position that the correct tension of the spring is obtained, set screw 12 may be tightened and the spring 17 will then be maintained at that particular tension until further manual adjustment is made.

While I have illustrated a preferred embodiment of my invention, I do not wish to be limited to the details of construction except as determined by the scope of the appended claims.

I claim:—

1. In a picture projector, a driving motor, a driving pulley for the projector mechanism operated by said motor, said pulley being movable bodily upon tilting of the projector mechanism, a driving belt for transmitting power between said motor and said pulley and means for maintaining a substantially uniform tension on said belt for all positions of said driving pulley comprising a pair of adjusting pulleys disposed on opposite sides of said belt, one of said adjusting pulleys being normally fixed relative to the frame of the projector and the other of said pulleys being bodily movable, and means for holding said movable pulley against said belt with a substantially constant force.

2. In a motion picture projector having a fixed motor carrying frame, an adjustable machine carrying frame, and a connecting driving belt, means for maintaining a fixed tension on the belt at different adjustments of the machine frame, said means comprising a fixed belt guide, a second belt guide supported adjacent thereto, and a spring for pressing said second guide against the belt.

3. In a picture projector, a driving motor, a driving pulley for the projector mechanism operated by said motor, said pulley being bodily movable upon tilting of the projector mechanism, a driving belt for transmitting power between the said motor and said pulley, a pair of pulleys disposed on opposite sides of said belt, one of said pulleys being normally fixed relative to the frame of the projector and the other of said pulleys being bodily movable, means for holding said movable pulley against said belt to maintain a substantially constant tension therein, and means for independently adjusting said normally fixed pulley to compensate for material discrepancies in the belt length.

4. In a picture projector having a fixed supporting frame for the driving motor and an adjustable frame carrying the projector mechanism a driving belt, means for automatically maintaining a constant tension in the belt at all angles of throw, said means comprising two idle pulleys positioned on opposite sides of the belt, one of said pulleys being held fixed relative to the motor carrying frame and the other being movable relative thereto.

5. In a picture projector, a fixed supporting frame for the driving motor and an adjustable frame for the projector mechanism, a driving belt, a member secured to said fixed frame, a pulley carried by said member and engaging the belt, a link pivoted to said member, and a second pulley carried by said link and adapted to engage the belt on the side opposite from that engaged by the first pulley with a substantially constant pressure.

6. In a picture projector, a fixed supporting frame for the driving motor and an adjustable frame for the projector mechanism, a driving belt, a member secured to said fixed frame, a pulley carried by said member and engaging one side of the belt, a link pivoted to said member, a second pulley carried by said link, and a spring adapted to engage said link and cause said second pulley to be held against the opposite side of said belt with constant pressure.

7. In a picture projector, a fixed frame for the driving motor and an adjustable frame for the projector mechanism, a driving belt, means for automatically maintaining a constant tension in this belt, said means comprising a member pivoted to said fixed frame, a set screw for securing said member rigidly to the frame, a pulley carried by said member and engaging one side of the belt, a link pivoted to said member, a second pulley carried by said link, and a spring adapted to engage said link and cause said second pulley to be held against the opposite side of the belt with constant pressure, the said member being adjustably connected to the fixed frame for securing manual variations of the range over which constant belt tension will be maintained.

In testimony whereof I affix my signature.

WILLIAM ELLWOOD.